UNITED STATES PATENT OFFICE.

FRANK J. WILSON, OF ALBUQUERQUE, NEW MEXICO.

PICKLING COMPOUND.

1,039,873. Specification of Letters Patent. Patented Oct. 1, 1912.

No Drawing. Application filed February 9, 1912. Serial No. 676,583.

*To all whom it may concern:*

Be it known that I, FRANK J. WILSON, a citizen of the United States, residing at Albuquerque, in the county of Bernalillo and State of New Mexico, have invented certain new and useful Improvements in Pickling Compounds, of which the following is a specification.

This invention relates to a compound for pickling meats and has as its object to provide a compound which is to be added to the pickling water for the purpose of rendering the water "hard," and which will to a certain extent reduce the time required for the pickling process and will, by its use, result in a more thorough and better treatment of the meats than by the use of the ordinary pickling brine or similar pickling solutions.

I have found by actual use of the compound embodying this invention that meats cured by the use thereof possess a flavor which is not obtainable by the use merely of brine or any of the well-known pickling solutions.

In preparing a quantity of the compound embodying the present invention for solution in approximately one million cubic centimeters of water there are employed the following ingredients substantially in the proportions stated:—

| | |
|---|---:|
| Calcium bicarbonate | 666.20 |
| Magnesium bicarbonate | 264.60 |
| Iron bicarbonate | 8.20 |
| Sodium bicarbonate | 79.20 |
| Sodium chlorid | 590.00 |
| Sodium sulfate | 15.20 |

These ingredients are added either separately or as a mixture to the quantity of water stated, and the whole is stirred until the ingredients are dissolved. To the solution thus obtained, there is added prior to carrying out the pickling process, a desired additional amount of sodium chlorid, or common salt, and sugar and potassium nitrate. The quantity of sodium chlorid, sugar and potassium nitrate added to the solution varies according as to whether the pickle is to be strong, mild or sweet.

Having thus described the invention what is claimed as new is:—

1. A pickling compound consisting of calcium bicarbonate, magnesium bicarbonate, iron bicarbonate, sodium bicarbonate, sodium chlorid, and sodium sulfate.

2. A pickling compound consisting of calcium bicarbonate, magnesium bicarbonate, iron bicarbonate, sodium bicarbonate, sodium chlorid, and sodium sulfate in about the proportions of calcium bicarbonate 666.20, magnesium bicarbonate 264.60, iron bicarbonate 8.20, sodium bicarbonate 79.20, sodium chlorid 590.00, sodium sulfate 15.20.

In testimony whereof I affix my signature in presence of two witnesses.

FRANK J. WILSON. [L. S.]

Witnesses:
SIMON STERN,
WILLARD S. STRICKLING.